US012689135B2

(12) United States Patent
Chen et al.

(10) Patent No.: US 12,689,135 B2
(45) Date of Patent: Jul. 21, 2026

(54) DUAL POLARIZED ANTENNA AND ELECTRONIC DEVICE

(71) Applicant: Nanning FuLian FuGui Precision Industrial Co., Ltd., Nanning (CN)

(72) Inventors: Yu-Chuan Chen, New Taipei (TW); Chia-Sheng Wei, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 55 days.

(21) Appl. No.: 18/780,549

(22) Filed: Jul. 23, 2024

(65) Prior Publication Data

US 2026/0031546 A1 Jan. 29, 2026

(51) Int. Cl.

| | |
|---|---|
| ***H01Q 21/06*** | (2006.01) |
| ***H01Q 9/04*** | (2006.01) |
| ***H01Q 21/00*** | (2006.01) |
| ***H01Q 21/24*** | (2006.01) |

(52) U.S. Cl.

CPC ......... *H01Q 21/065* (2013.01); *H01Q 9/0435* (2013.01); *H01Q 21/0075* (2013.01); *H01Q 21/24* (2013.01)

(58) Field of Classification Search

CPC .... H01Q 9/0435; H01Q 21/065; H01Q 21/24; H01Q 21/0075; H01Q 21/28–293

See application file for complete search history.

(56) References Cited

U.S. PATENT DOCUMENTS 3,587,110 A * 6/1971 Woodward ........... H01Q 21/062 343/905
4,054,874 A * 10/1977 Oltman, Jr. .......... H01Q 9/0457 343/797
4,614,947 A * 9/1986 Rammos ................ H01Q 13/18 343/778
4,792,810 A * 12/1988 Fukuzawa .......... H01Q 21/0081 343/778
4,827,276 A * 5/1989 Fukuzawa .............. H01Q 21/24 343/769

(Continued)

FOREIGN PATENT DOCUMENTS

CN 111987435 11/2020
CN 216389736 U * 4/2022

(Continued)

*Primary Examiner* — Ab Salam Alkassim, Jr.
(74) *Attorney, Agent, or Firm* — ScienBiziP, P.C.

(57) ABSTRACT

A dual polarized antenna is arranged on a circuit board, including: M array antenna units arranged on a top layer of a circuit board; a first polarized feeding network arranged at a bottom of the circuit board, including a first feeding port and M first feeding network subunits; each first feeding network subunit corresponds to an array antenna unit, and each first feed network subunit is electrically connected to the corresponding array antenna unit through the first group of metal holes to excite the corresponding array antenna unit; a second polarized feed network arranged at the bottom, including a second feeding port and M second feeding network subunits, each second feeding network subunit corresponds to an array antenna unit, and each second feeding network subunit is electrically connected to the corresponding array antenna unit through a second group of metal holes to excite the corresponding array antenna unit.

16 Claims, 11 Drawing Sheets

(56) References Cited

U.S. PATENT DOCUMENTS 4,973,972 A * 11/1990 Huang .................. H01Q 1/523 333/26
6,091,373 A * 7/2000 Raguenet ............. H01Q 9/0435 343/778
6,184,828 B1 * 2/2001 Shoki ....................... H01Q 3/26 342/372
6,317,094 B1 * 11/2001 Wu .................... H01Q 21/0087 343/770
11,742,592 B2 * 8/2023 Fan ...................... H01Q 21/062 343/810
2001/0007446 A1 * 7/2001 Amano .............. H01Q 21/0075 343/860
2002/0080071 A1 * 6/2002 Louzir ............... H01Q 21/0006 343/700 MS
2004/0155819 A1 * 8/2004 Martin ................. H01Q 25/001 343/824
2006/0139215 A1 * 6/2006 Heiniger .............. H01Q 9/0407 343/700 MS
2009/0309804 A1 * 12/2009 Chen .................. H01Q 21/0075 343/893
2014/0184457 A1 * 7/2014 Lea ....................... H04W 76/27 343/747
2015/0236421 A1 * 8/2015 Zemliakov ........... H01Q 9/0435 343/700 MS
2016/0308285 A1 * 10/2016 Howard ............... H01Q 21/065
2018/0241135 A1 * 8/2018 Furlan ................ H01Q 21/0075
2018/0309210 A1 * 10/2018 Sudo ........................ H01Q 3/24
2018/0331420 A1 * 11/2018 Brobston ................. H01Q 3/24
2019/0165475 A1 * 5/2019 Shibata .................. H01Q 9/045
2019/0252755 A1 * 8/2019 Shamsinejad ............. H01P 5/19
2019/0393616 A1 * 12/2019 Pelletti ................. H01Q 21/065
2020/0227835 A1 * 7/2020 Kim ..................... H01Q 21/065
2020/0411950 A1 * 12/2020 Kuroda ................ H01Q 1/2283
2021/0013623 A1 * 1/2021 Wang ................... H01Q 21/065
2021/0250079 A1 * 8/2021 Ariumi .................... H04B 7/10
2022/0302603 A1 * 9/2022 Chieh ................ H01Q 21/0075
2022/0368026 A1 * 11/2022 Hollenbeck ........ H01Q 21/0037
2024/0072434 A1 * 2/2024 Braun ........................ H01P 5/16
2024/0195481 A1 * 6/2024 Hwang ................ H04B 7/0695
2024/0258705 A1 * 8/2024 Ding ...................... H01Q 21/08
2025/0030176 A1 * 1/2025 Li ........................ H01Q 9/0435

FOREIGN PATENT DOCUMENTS

CN 116941130 A 10/2023
CN 117293548 A 12/2023

* cited by examiner

| Name | Theta | Ang | Mag |
|---|---|---|---|
| m1 | 0.0000 | 0.0000 | 15.4954 |

| Name | Theta | Ang | Mag |
|---|---|---|---|
| m1 | 0.0000 | 0.0000 | 15.4954 |

| Name | Theta | Ang | Mag |
|---|---|---|---|
| m1 | 0.0000 | 0.0000 | 15.4954 |

DUAL POLARIZED ANTENNA AND ELECTRONIC DEVICE

FIELD

The present disclosure generally relates to a technical field of antenna, and more particularly to a dual polarized antenna and electronic device.

BACKGROUND

A dual polarization array antenna can simultaneously receive or transmit signals with two polarization modes perpendicular to each other, without interfering with each other, reducing the number of antennas and saving space occupied by antennas. However, traditional array antennas can only be designed as single polarization due to the limitation of PCB layout. If there is a need for dual polarization, another set of array antennas is needed, which increases the size of the product and cannot meet the miniaturization requirements. Additionally, adding a set of array antennas also leads to an increase in product cost.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
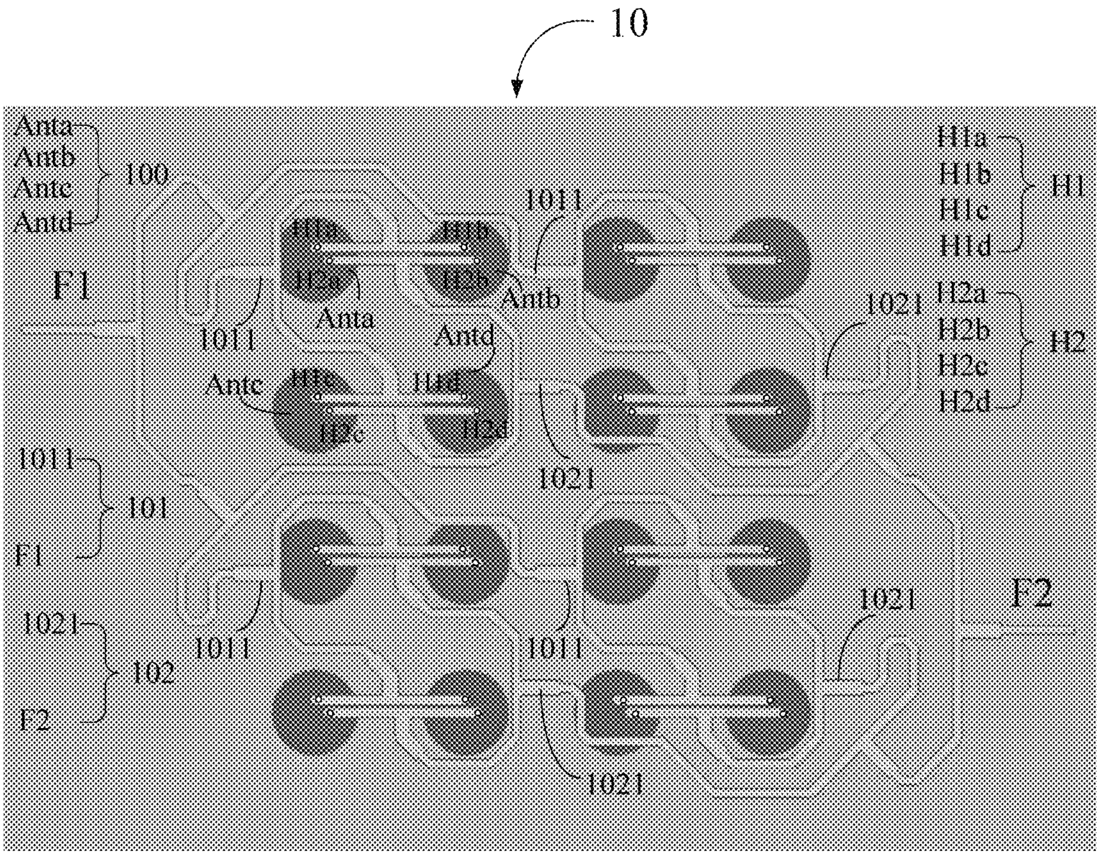
FIG. 1 is a schematic diagram of the structure of a dual polarized antenna according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
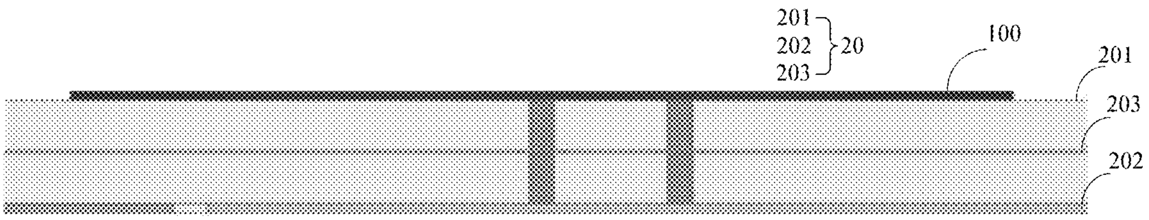
FIG. 2 is a schematic diagram of a stacked structure of a dual polarized antenna according to an embodiment of the present disclosure.

Referring to FIG. 1-FIG. 2, FIG. 1 is a schematic diagram of the structure of a dual polarized antenna according to an embodiment of the present disclosure. FIG. 2 is a schematic diagram of a stacked structure of a dual polarized antenna according to an embodiment of the present disclosure. In the embodiment, a dual polarized antenna 10 is mainly used in electronic devices, such as satellite communication products, base stations, etc. As shown in FIG. 2, the dual polarized antenna 10 is installed on a circuit board 20. The circuit board 20 includes a top layer 201, a bottom layer 202, and a middle layer 203, and the middle layer is a grounding layer. As shown in FIG. 1, the dual polarized antenna 10 includes M array antenna units 100, a first polarized feeding network 101, and a second polarized feeding network 102. M array antenna units 100 are arranged on the top layer 201 of the circuit board 20, wherein M is an integer greater than or equal to 1. Each array antenna unit 100 includes 4 antenna units Anta-Antd, that is, the dual polarization antenna 10 is an M*4 array antenna. Each antenna unit is preferably a circular patch antenna, and the four antenna units are located at four corners of a square. In order to better explain the present disclosure, in the embodiment, taking the 4 array antenna units as an example, but not limited to this.

The first polarized feeding network 101 is arranged on the bottom layer 202 of the circuit board 20. The first polarized feeding network 101 includes a first feeding port F1 and four first feeding network subunits 1011. The four first feeding network subunits 1011 are connected through T-junctions.

The first polarized feeding network 101 is configured to divide a feeding signal of the first feeding port F1 into 16 equal sub-signals.

Each first feeding network subunit 1011 corresponds to an array antenna unit 100. Each first feeding network subunit 1011 is electrically connected to the corresponding array antenna unit 100 through a first group of metal holes H1 (H1*a*-H1*d*). Each first feeding network subunit 1011 excites the corresponding array antenna unit through the first group of metal holes H1 to form a first polarization pattern.

The second polarized feeding network 102 is arranged on the bottom layer 202 of the circuit board 20. The second polarized feeding network 102 includes a second feeding port F2 and four second feeding network subunits 1021. The four second feeding network subunits 1021 are connected through T-junctions. The second polarized feeding network 102 is configured to divide a feeding signal of the second feeding port F2 into 16 equal sub-signals. Each second feeding network subunit 1021 corresponds to an array antenna unit 100. Each second feeding network subunit 1021 is electrically connected to the corresponding array antenna unit 100 through a second group of metal holes H2. Each second feeding network subunit 1021 excites the corresponding array antenna unit 100 through the second group of metal holes H2 (H2*a*-H2*d*) to form a second polarization pattern.

Figure 3:
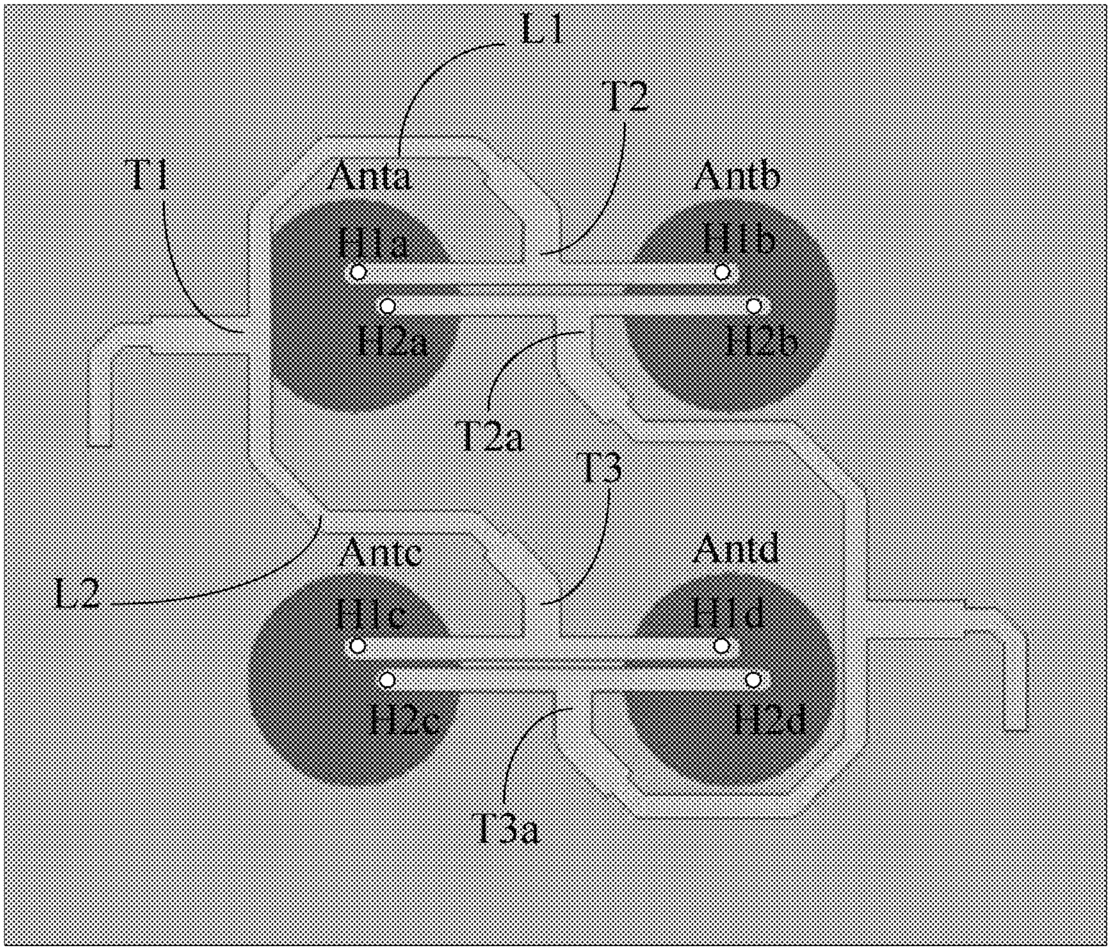
FIG. 3 is a schematic diagram of a structure of the first feeding network subunit and the second feeding network subunit of the dual polarized antenna according to an embodiment of the present disclosure.

Specifically, combined with FIG. 3, FIG. 3 is a schematic diagram of a structure of the first feeding network subunit and the second feeding network subunit of the dual polarized antenna according to an embodiment of the present disclosure. The first polarized feeding network 101 includes a first feeding port F1 and four first feeding network subunits 1011. As shown in the FIG. 3, each first feeding network subunit 1011 includes a first T-junction T1, a second T-junction T2, and a third T-junction T3. The first T-junction T1 includes an input end, a first output end, and a second output end. The first T-junction T1 is configured to divide the input signal of the first T-junction into two equal sub-signals. The second T-junction T2 includes an input end, a first output end and a second output end. The input end of the second T-junction T2 is electrically connected to the first output end of the first T-junction T1 through a first microstrip line L1. The second T-junction T2 is configured to divide an output signal of the first output end of the first T-junction T1 into two equal sub-signals. The third T-junction T3 includes an input end, a first output end, and a second output end. The input end of the third T-junction T3 is electrically connected to the second output end of the first T-junction T1 through a second microstrip line L2. The third T-junction T3 is configured to divide an output signal of the second output end of the first T-junction T1 into two equal sub-signals. A length of the first microstrip line L1 is equal to a length of the second microstrip line L2. The first output end and the second output end of the second T-junction T2 and the first output end and the second output end of the third T-junction T3 are respectively electrically connected to the four antenna units Ant of the array antenna unit 100 through metal holes. According to FIG. 2, the first output end and second output end of the second T-junction T2 of the first feeding network subunit 1011 are respectively electrically connected to the antenna units Anta and Antb through metal holes H1*a* and H1*b*. The first output end and second output end of the third T-junction T3 of the first feeding network subunit 1011 are respectively electrically connected to the antenna units Antc and Antd through metal holes H1*c* and H1*d*. A structure of the second feeding network subunit 1021 is the same as that of the first feeding network subunit 1011, and will not be repeated here. As shown in the FIG. 2, the first output end and the second output end of the second T-junction T2*a* of the second feeding network subunit 1021 are respectively electrically connected to the antenna units Anta and Antb through metal holes H2*a* and H2*b*. The first output end and the second output end of the third T-junction T3*a* of the second feeding network subunit 1021 are respectively electrically connected to the antenna units Antc and Antd through metal holes H2*c* and H2*d*.

Figure 4:
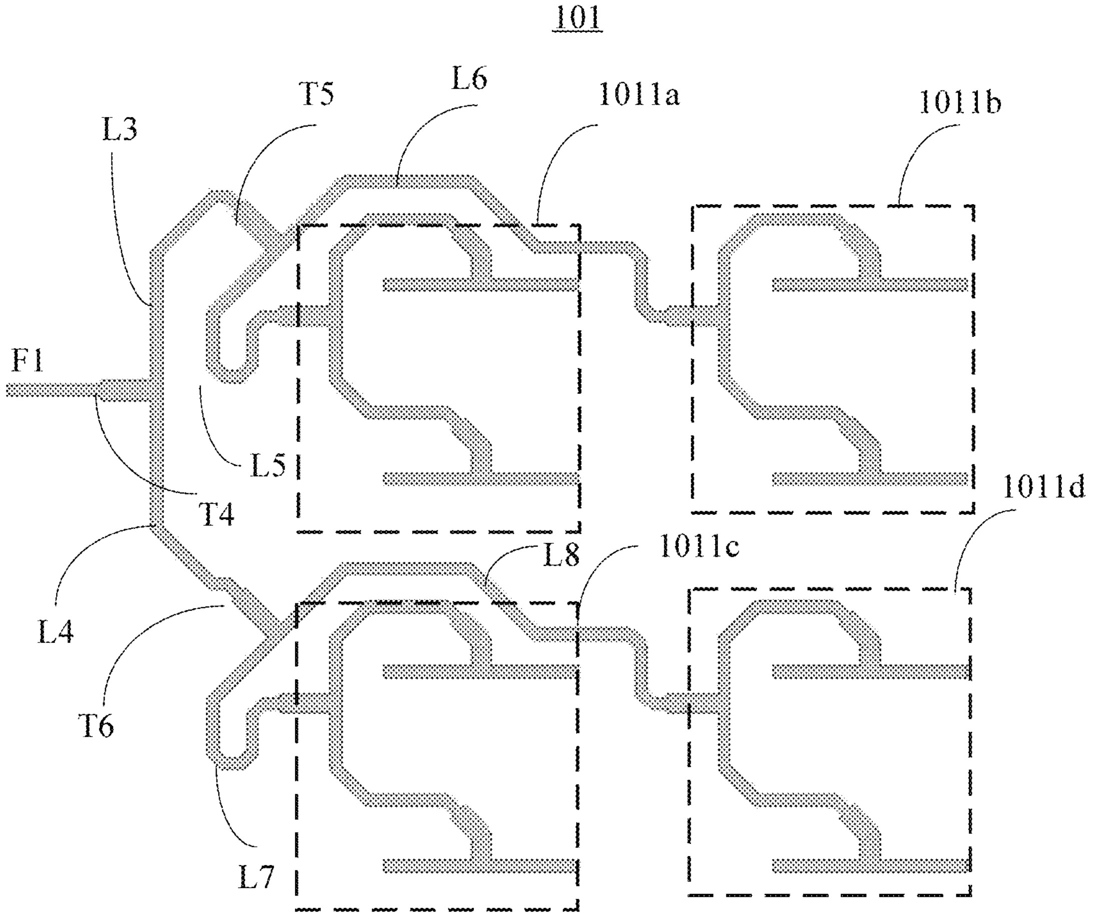
FIG. 4 is a schematic diagram of a structure of the first polarized feeding network of the dual polarization antenna according to an embodiment of the present disclosure.

Combined with FIG. 4, FIG. 4 is a schematic diagram of a structure of the first polarized feeding network of the dual polarization antenna according to an embodiment of the present disclosure. The first polarized feeding network 101 includes the first feeding port F1, four first feeding network subunits, a fourth T-junction T4, a fifth T-junction T5, and a sixth T-junction T6. In the embodiment, the four first feeding network subunits are defines as a first first feeding network subunit 1011*a*, a second first feeding network subunit 1011*b*, a third first feeding network subunit 1011*c*, a fourth first network feeding network subunit 1011*d*. The fourth T-junction T4 includes an input end, a first output end, and a second output end. The input end of the fourth T-junction T4 is electrically connected to the first input end F1. The fourth T-junction T4 is configured to divide the signal of the first input end F1 into two equal sub-signals. The fifth T-junction T5 includes an input end, a first output end, and a second output end. The input end of the fifth T-junction T5 is electrically connected to the first output end of the fourth T-junction T4 through a third microstrip line L3, the first output end of the fifth T-junction T5 is electrically connected to the first first feeding network subunit 1011*a* through a fifth microstrip line L5, and the second output end of the fifth T-junction T5 is electrically connected to the second first feeding network subunit 1011*b* through a sixth microstrip line L6. The sixth T-junction T6 includes an input end, a first output end, and a second output end. The input end of the sixth T-junction T6 is electrically connected to the second output end of the fourth T-junction T4 through a fourth microstrip line L4, the first output end of the sixth T-junction T6 is electrically connected to the third first feeding network subunit 1011*c* through a seventh microstrip line L7, and the second output end of the sixth T-junction T6 is electrically connected to the fourth first feeding network subunit 1011*d* through an eighth microstrip line L8. The first polarized feeding network 101 divides the feeding signal of the first feeding port F1 into 16 equal sub-signals. The length of the third microstrip line L3 is the same as the length of the fourth microstrip line L4. Due to the unequal length of the fifth microstrip line L5 and the sixth microstrip line L6, the length of the sixth microstrip line L6 is one wavelength longer than that of the fifth microstrip line L5, so that the phase of the signal entering the first first feeding network subunit 1011*a* is equal to the phase of the signal entering the second first feeding network subunit 1011*b*. Similarly, the length of the eighth microstrip line L8 is one wavelength longer than the length of the seventh microstrip line L7.

In the embodiment, the structure of the second polarized feeding network 102 is the same as that of the first polarized feeding network 101, which is not detailed here.

Figure 5:
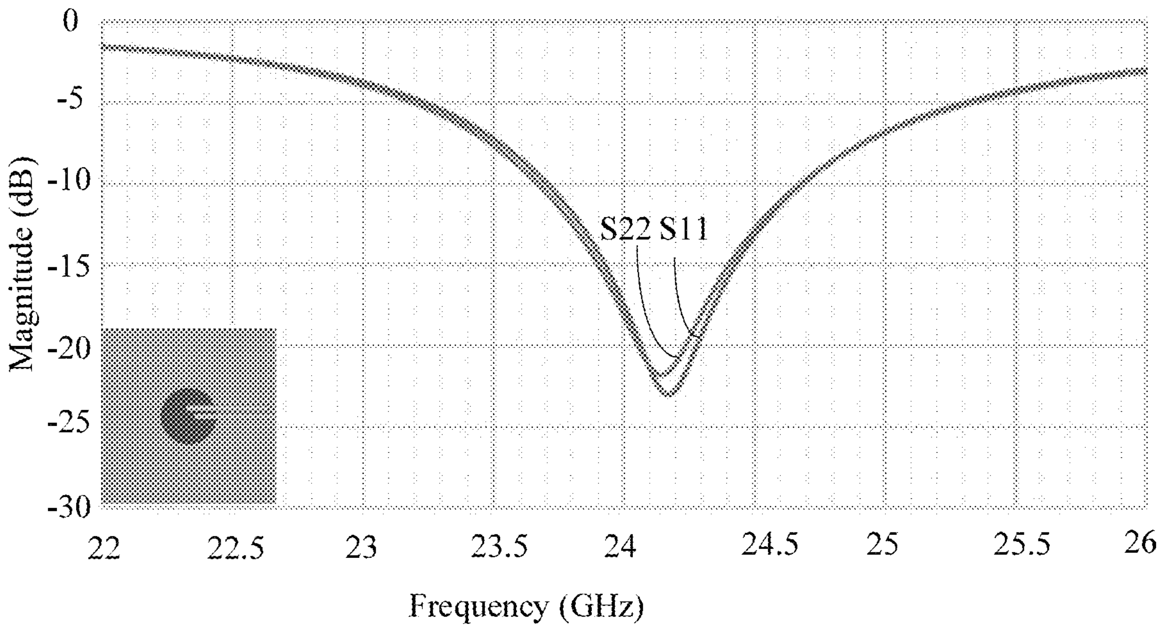
FIG. 5 is a schematic diagram of S-parameter curves of one antenna unit of the dual polarized antenna according to an embodiment of the present disclosure.

Referring to FIG. 5, FIG. 5 is a schematic diagram of S-parameter curves of one antenna unit of the dual polarized antenna according to an embodiment of the present disclosure. According to S11 and S22 parameter curves, the operating bandwidth of the antenna unit covers the 24 GHz frequency band, and the return loss is below −10 dB.

Figure 6:
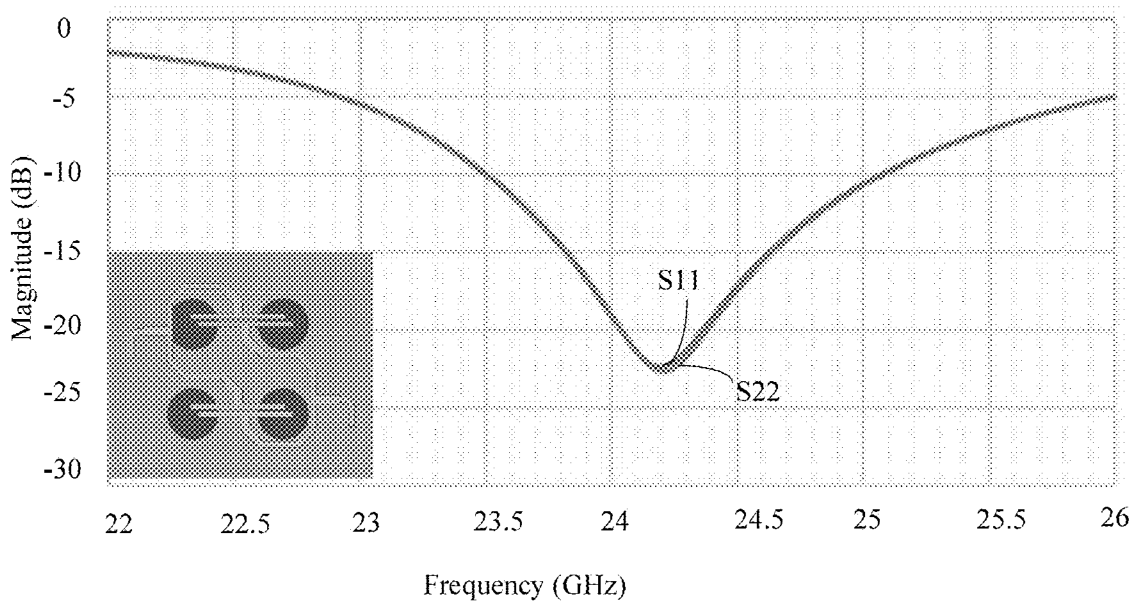
FIG. 6 is a schematic diagram of S-parameter curves of one array antenna unit of the dual polarized antenna according to an embodiment of the present disclosure.

Referring to FIG. 6, FIG. 6 is a schematic diagram of S-parameter curves of one array antenna unit of the dual polarized antenna according to an embodiment of the present disclosure. According to S11 and S22 parameter curves, the operating bandwidth of the array antenna unit covers the 24 GHz frequency band, and the return loss is below −10 dB.

Figure 7:
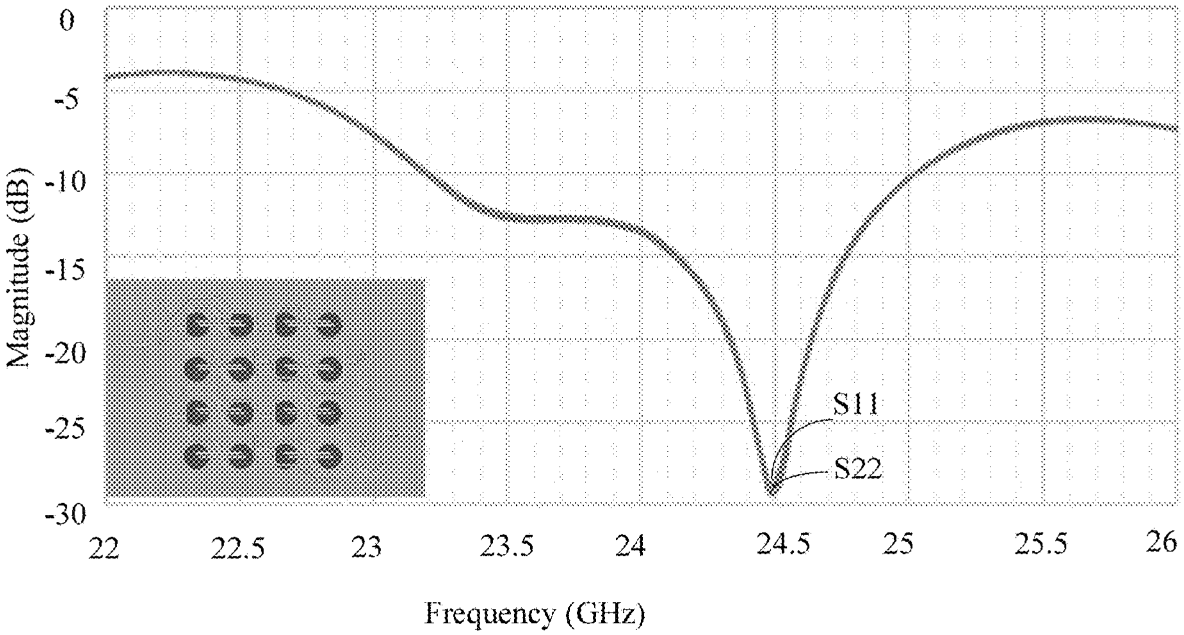
FIG. 7 is a schematic diagram of S-parameter curves of the dual polarized antenna according to an embodiment of the present disclosure.

Referring to FIG. 7, FIG. 7 is a schematic diagram of S-parameter curves of the dual polarized antenna according to an embodiment of the present disclosure. According to S11 and S22 parameter curves, the operating bandwidth of the dual polarized antenna covers the 24 GHz frequency band, and the return loss is below −10 dB.

Figure 8:
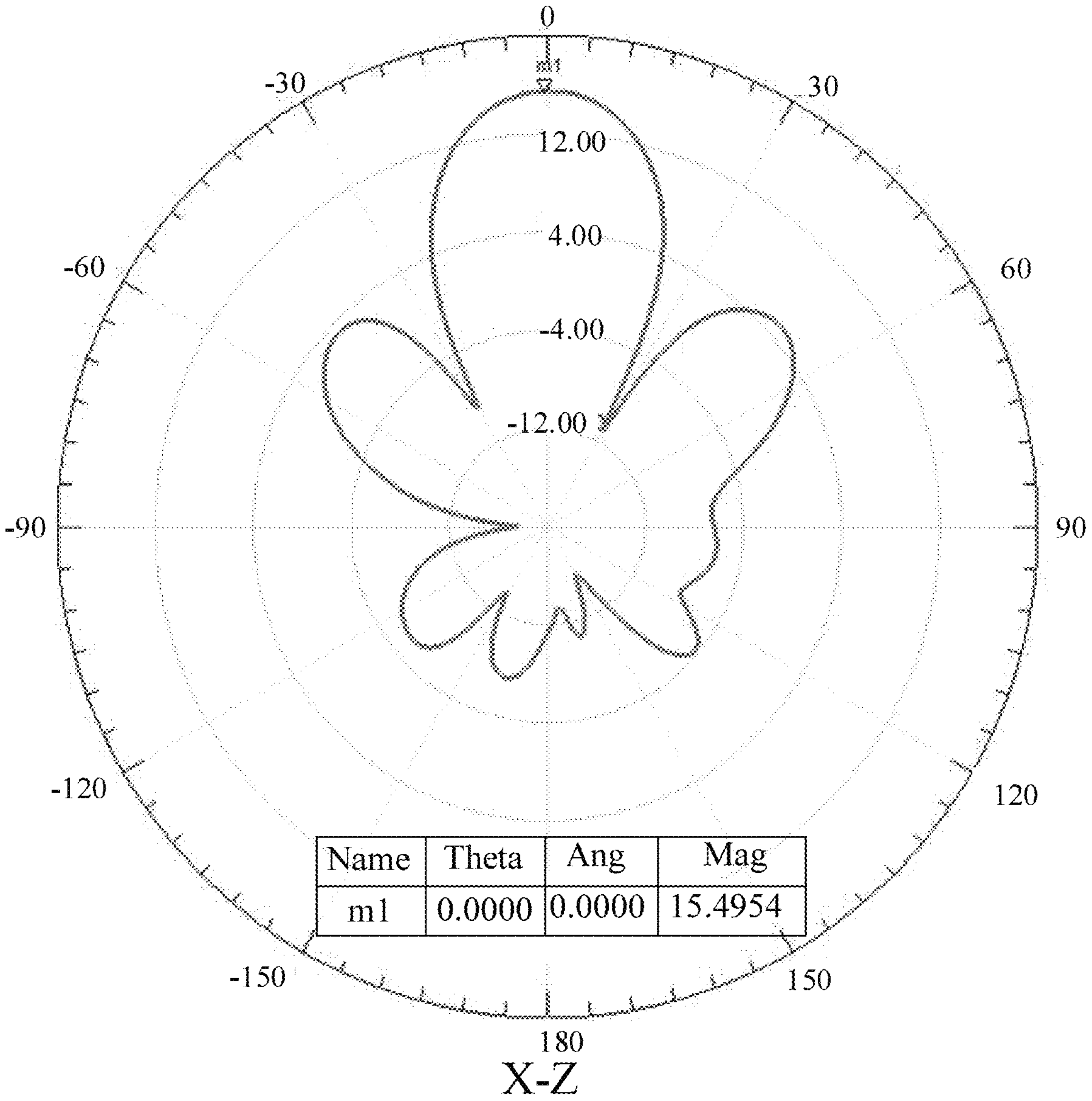
FIG. 8 is a pattern diagram of the first polarization pattern of the dual polarization antenna in an X-Z plane according to an embodiment of the present disclosure.

Referring to FIG. 8, FIG. 8 is a pattern diagram of the first polarization pattern of the dual polarization antenna in an X-Z plane according to an embodiment of the present disclosure. As shown in the FIG. 8, the first polarization pattern has the characteristics of high directivity and high gain, meeting the performance requirements of the array antenna.

Figure 9:
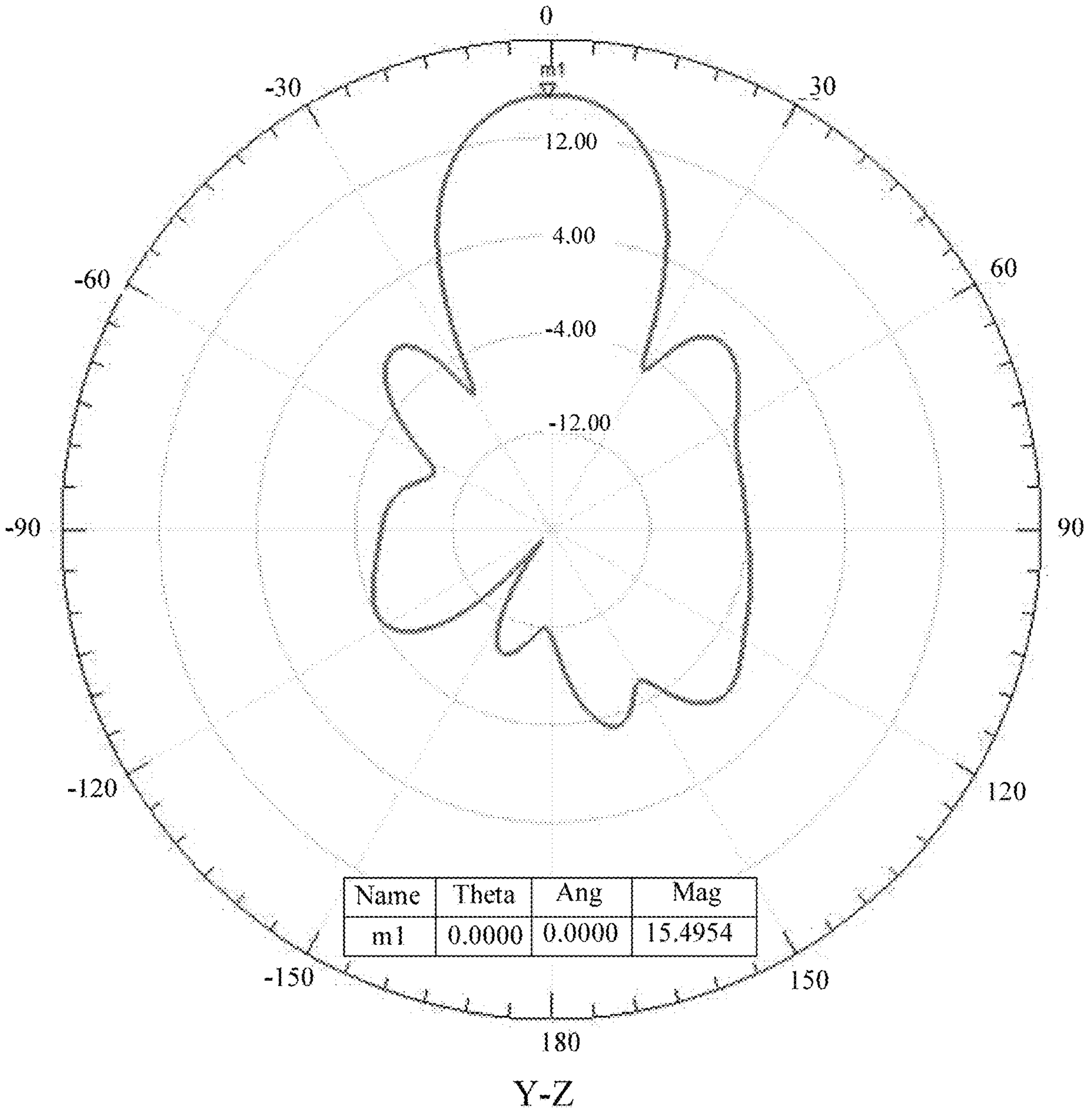
FIG. 9 is a pattern diagram of the first polarization pattern of the dual polarization antenna in a Y-Z plane according to an embodiment of the present disclosure.

Referring to FIG. 9, FIG. 9 is a pattern diagram of the first polarization pattern of the dual polarization antenna in a Y-Z plane according to an embodiment of the present disclosure. As shown in the FIG. 9, the first polarization pattern has the characteristics of high directivity and high gain, meeting the performance requirements of the array antenna.

Figure 10:
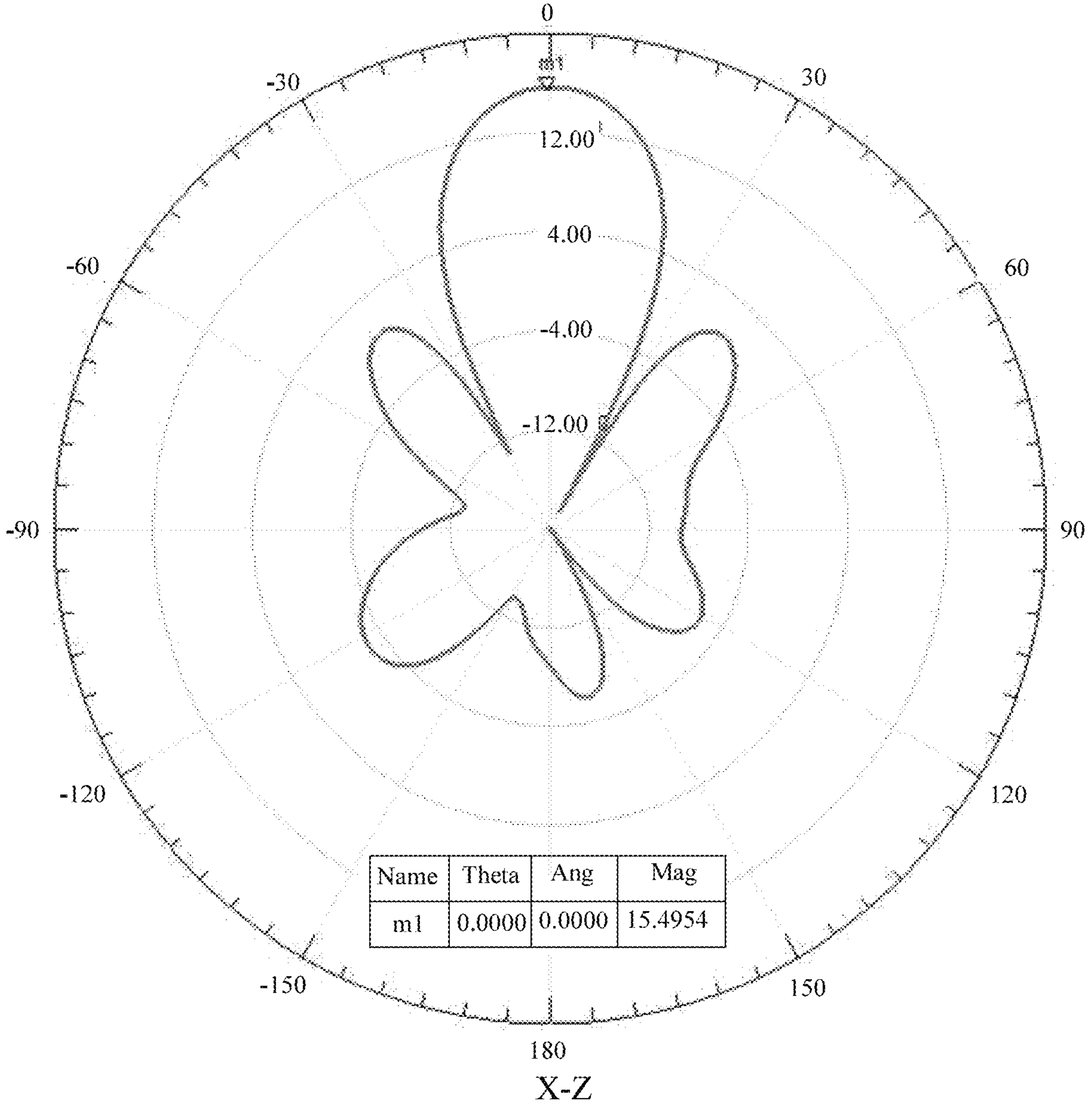
FIG. 10 is a pattern diagram of the second polarization pattern of the dual polarization antenna in an X-Z plane according to an embodiment of the present disclosure.

Referring to FIG. 10, FIG. 10 is a pattern diagram of the second polarization pattern of the dual polarization antenna in an X-Z plane according to an embodiment of the present disclosure. As shown in the FIG. 10, the second polarization pattern has the characteristics of high directivity and high gain, meeting the performance requirements of the array antenna.

Figure 11:
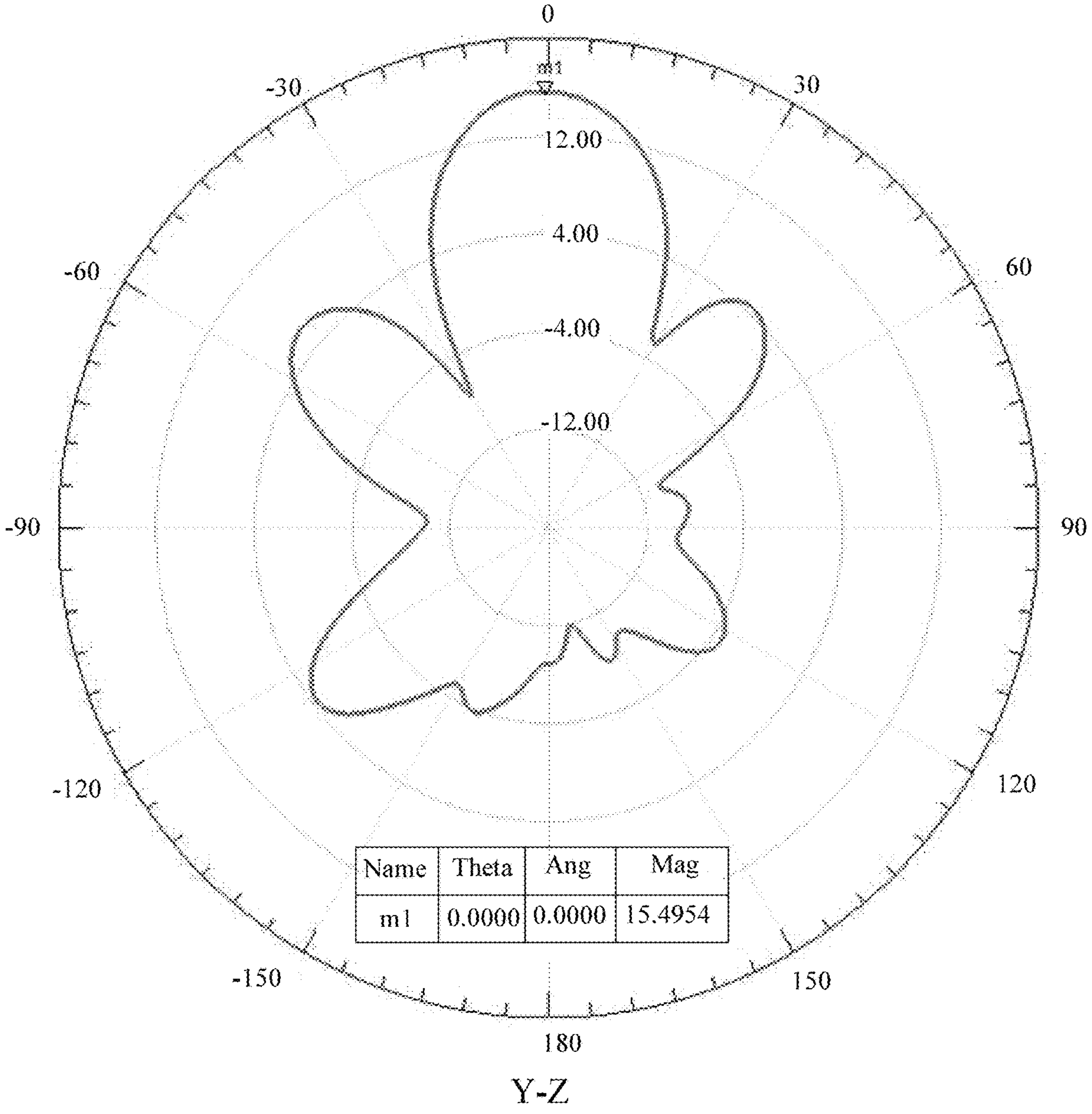
FIG. 11 is a pattern diagram of the second polarization pattern of the dual polarization antenna in a Y-Z plane according to an embodiment of the present disclosure.

Referring to FIG. 11, FIG. 11 is a pattern diagram of the second polarization pattern of the dual polarization antenna in a Y-Z plane according to an embodiment of the present disclosure. As shown in the FIG. 11, the second polarization pattern has the characteristics of high directivity and high gain, meeting the performance requirements of the array antenna.

Compared to the prior art, the dual polarization antenna and electronic device provided by the present disclosure includes M array antenna units, a first polarized feeding network, and a second polarized feeding network. M array antenna units are arranged on the top layer of the circuit board, and the first polarized feeding network and the second polarized feeding network are arranged on the bottom layer of the circuit board. The first polarized feeding network and the second polarized feeding network excite the array antenna units of the top layer through metal holes to generate the first polarization pattern and the second polarization pattern, without adding another group array antennas to achieve dual polarization and reduce product volume, meeting the demand for product miniaturization. Further, the first polarized feeding network and the second polarized feeding network are arranged on the same layer, and the dual polarized feeding network is single-layer layout design, which reduces the number of layers of the circuit board and reduces the production cost.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A dual polarized antenna arranged on a circuit board, the circuit board comprising a top layer, a bottom layer, and a middle layer, the middle layer being a ground layer, and the dual polarized antenna comprising:

M array antenna units, arranged on the top layer of the circuit board, wherein M is an integer greater than or equal to 4, each array antenna unit comprises four antenna units, and the four antenna units are located at four corners of a square;

a first polarized feeding network, arranged on the bottom layer of the circuit board, wherein the first polarized feeding network comprises a first feeding port and M first feeding network subunits, and the first polarized feeding network is configured to divide a feeding signal of the first feeding port into M*4 equal sub-signals, each first feeding network subunit corresponds to one array antenna unit, the each first feeding network subunit is electrically connected to a corresponding array antenna unit through a first group of metal holes, and the each first feeding network subunit excites the corresponding array antenna unit through the first group of metal holes; and the first polarized feeding network further comprises: a fourth T-junction comprising an input end, a first output end and a second output end, wherein the input end of the fourth T-junction is electrically connected to the first feeding port; a fifth T-junction comprising an input end, a first output end and a second output end, wherein the input end of the fifth T-junction is electrically connected to the first output end of the fourth T-junction through a third microstrip line, the first output end of the fifth T-junction is electrically connected to one of the M first feeding network subunits through a fifth microstrip line, and the second output end of the fifth T-junction is electrically connected to another one of the M first feeding network subunits through a sixth microstrip line; and a length of the sixth microstrip line is one wavelength longer than a length of the fifth microstrip line;

a second polarized feeding network, arranged on the bottom layer of the circuit board, wherein the second polarized feeding network comprises a second feeding port and M second feeding network subunits, and the second polarized feeding network is configured to divide a feeding signal of the second feeding port into M*4 equal sub-signals, each second feeding network subunit corresponds to one array antenna unit, the each second feeding network subunit is electrically connected to the corresponding array antenna unit through a second group of metal holes, and the each second feeding network subunit excites the corresponding array antenna unit through the second group of metal holes;

wherein each of the M first feeding network subunit comprises:

a first T-junction, comprising an input end, a first output end and a second output end, wherein the first T-junction is configured to divide a signal of the input end of the first T-junction into two equal sub-signals;

a second T-junction, comprising an input end, wherein the input end of the second T-junction is electrically connected to the first output end of the first T-junction through a first microstrip line, thereby dividing an output signal of the first output end of the first T-junction into two equal sub-signals;

a third T-junction, comprising an input end, wherein the input end of the third T-junction is electrically connected to the second output end of the first T-junction through a second microstrip line, and the third T-junction is configured to divide an output signal of the second output end of the first T-junction into two equal sub-signals; and the second T-junction is parallel to the third T-junction.

2. The dual polarized antenna according to claim 1, wherein a first output end of the second T-junction, a second output end of the second T-junction, a first output end of the third T-junction and a second output end of the third T-junction are respectively electrically connected to four antenna units of the M array antenna units through metal holes.

3. The dual polarized antenna according to claim 1, wherein a length of the first microstrip line is equal to a length of the second microstrip line.

4. The dual polarized antenna according to claim 1, wherein a structure of the first feeding network subunit is same as a structure of the second feeding network subunit.

5. The dual polarized antenna according to claim 1, wherein each of the four antenna units is a circular patch antenna.

6. The dual polarized antenna according to claim 1, wherein:

the M array antenna units are 4 array antenna units;

the fourth T-junction is configured to divide the signal of the first feeding port into two equal sub-signals;

the first polarized feeding network comprises the first feeding port, a first first feeding network subunit, a second first feeding network subunit, a third first feeding network subunit, a fourth first network feeding network subunit; the first output end of the fifth T-junction is electrically connected to the first first feeding network subunit through the fifth microstrip line, and the second output end of the fifth T-junction is electrically connected to the second first feeding network subunit through the sixth microstrip line, and the first polarized feeding network further comprises:

a sixth T-junction, comprising an input end, a first output end, and a second output end, the input end of the sixth T-junction is electrically connected to the second output end of the fourth T-junction through a fourth microstrip line, the first output end of the sixth T-junction is electrically connected to the third first feeding network subunit through a seventh microstrip line, and the second output end of the sixth T-junction is electrically connected to the fourth first feeding network subunit through an eighth microstrip line.

7. The dual polarized antenna according to claim 6, wherein:

a length of the eighth microstrip line is one wavelength longer than a length of the seventh microstrip line.

8. The dual polarized antenna according to claim 7, wherein a structure of the first polarized feeding network is same as a structure of the second polarized feeding network.

9. An electronic device, comprising a dual polarized antenna, wherein the dual polarized antenna is arranged on a circuit board, the circuit board comprises a top layer, a bottom layer, and a middle layer, the middle layer is a ground layer, and the dual polarized antenna comprises:

M array antenna units, arranged on the top layer of the circuit board, wherein M is an integer greater than or equal to 4; and each array antenna unit comprises four antenna units, and the four antenna units are located at four corners of a square;

a first polarized feeding network, arranged on the bottom layer of the circuit board, wherein the first polarized feeding network comprises a first feeding port and M first feeding network subunits, and the first polarized feeding network is configured to divide a feeding signal of the first feeding port into M*4 equal sub-signals; each first feeding network subunit corresponds to one array antenna unit, the each first feeding network subunit is electrically connected to a corresponding array antenna unit through a first group of metal holes; and the each first feeding network subunit excites the corresponding array antenna unit through the first group of metal holes; and the first polarized feeding network further comprises: a fourth T-junction comprising an input end, a first output end and a second output end, wherein the input end of the fourth T-junction is electrically connected to the first feeding port; a fifth T-junction comprising an input end, a first output end and a second output end, wherein the input end of the fifth T-junction is electrically connected to the first output end of the fourth T-junction through a third microstrip line, the first output end of the fifth T-junction is electrically connected to one of the M first feeding network subunits through a fifth microstrip line, and the second output end of the fifth T-junction is electrically connected to another one of the M first feeding network subunits through a sixth microstrip line; and a length of the sixth microstrip line is one wavelength longer than a length of the fifth microstrip line;

a second polarized feeding network, arranged on the bottom layer of the circuit board, wherein the second polarized feeding network comprises a second feeding port and M second feeding network subunits, and the second polarized feeding network is configured to divide a feeding signal of the second feeding port into M*4 equal sub-signals; each second feeding network subunit corresponds to one array antenna unit, the each second feeding network subunit is electrically connected to the corresponding array antenna unit through a second group of metal holes; and the each second feeding network subunit excites the corresponding array antenna unit through the second group of metal holes;

wherein each of the M first feeding network subunit comprises:

a first T-junction, comprising an input end, a first output end and a second output end, wherein the first T-junction is configured to divide a signal of the input end of the first T-junction into two equal sub-signals;

a second T-junction, comprising an input end, wherein the input end of the second T-junction is electrically connected to the first output end of the first T-junction through a first microstrip line, thereby dividing an output signal of the first output end of the first T-junction into two equal sub-signals;

a third T-junction, comprising an input end, wherein the input end of the third T-junction is electrically connected to the second output end of the first T-junction through a second microstrip line, and the third T-junction is configured to divide an output signal of the second output end of the first T-junction into two equal sub-signals; the second T-junction is parallel to the third T-junction.

10. The electronic device according to claim 9, wherein a first output end of the second T-junction, a second output end of the second T-junction, a first output end of the third T-junction and a second output end of the third T-junction are respectively electrically connected to four antenna units of the M array antenna units through metal holes.

11. The electronic device according to claim 9, wherein a length of the first microstrip line is equal to a length of the second microstrip line.

12. The electronic device according to claim 9, wherein a structure of the first feeding network subunit is same as a structure of the second feeding network subunit.

13. The electronic device according to claim 9, wherein each of the four antenna units is a circular patch antenna.

14. The electronic device according to claim 9, wherein:

the M array antenna units are 4 array antenna units;

the fourth T-junction is configured to divide the signal of the first feeding port into two equal sub-signals;

the first polarized feeding network comprises the first feeding port, a first first feeding network subunit, a second first feeding network subunit, a third first feeding network subunit, a fourth first network feeding network subunit; the first output end of the fifth T-junction is electrically connected to the first first feeding network subunit through the fifth microstrip line, and the second output end of the fifth T-junction is electrically connected to the second first feeding network subunit through the sixth microstrip line, and the first polarized feeding network further comprises:

a sixth T-junction, comprising an input end, a first output end, and a second output end, the input end of the sixth T-junction is electrically connected to the second output end of the fourth T-junction through a fourth microstrip line, the first output end of the sixth T-junction is electrically connected tothe third first feeding network subunit through a seventh microstrip line, and the second output end of the sixth T-junction is electrically connected to the fourth first feeding network subunit through an eighth microstrip line.

15. The electronic device according to claim 14, wherein:

a length of the eighth microstrip line is one wavelength longer than a length of the seventh microstrip line.

16. The electronic device according to claim 15, wherein a structure of the first polarized feeding network is same as a structure of the second polarized feeding network.

* * * * *